United States Patent
Eastlake, III et al.

(10) Patent No.: US 11,418,318 B2
(45) Date of Patent: Aug. 16, 2022

(54) PORTABLE CERTIFICATION AUTHORITY

(75) Inventors: Donald E. Eastlake, III, Milford, MA (US); Anthony R. Metke, Naperville, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 5366 days.

(21) Appl. No.: 11/465,620

(22) Filed: Aug. 18, 2006
(Under 37 CFR 1.47)

(65) Prior Publication Data
US 2008/0046716 A1  Feb. 21, 2008

(51) Int. Cl.
| | |
|---|---|
| H04L 29/00 | (2006.01) |
| H04L 9/00 | (2022.01) |
| H04L 9/40 | (2022.01) |
| H04L 9/32 | (2006.01) |

(52) U.S. Cl.
CPC ............ *H04L 9/006* (2013.01); *H04L 9/3263* (2013.01); *H04L 63/0823* (2013.01); *H04L 63/06* (2013.01); *H04L 2209/80* (2013.01)

(58) Field of Classification Search
USPC .................... 713/155–158, 173, 175; 726/10
See application file for complete search history.

(56) References Cited

U.S. PATENT DOCUMENTS

| | | | |
|---|---|---|---|
| 7,231,371 B1* | 6/2007 | Cantini et al. ................... 705/65 |
| 2003/0056099 A1* | 3/2003 | Asanoma et al. ............ 713/172 |
| 2005/0005097 A1* | 1/2005 | Murakawa ..................... 713/156 |
| 2005/0120202 A1* | 6/2005 | Cuellar et al. ................ 713/156 |
| 2007/0022469 A1* | 1/2007 | Cooper et al. ..................... 726/3 |

* cited by examiner

*Primary Examiner* — Jeffrey C Pwu
*Assistant Examiner* — Helai Salehi

(57) ABSTRACT

A portable electronic device is operable as a portable certification authority. The portable electronic device stores a pair of keys of a public key infrastructure, issued by a parent certification authority and generates a certificate dependent upon the pair of keys. The private key and corresponding public key certificate are transmitted to a network device of a second agency to allow the device to be authenticated by any node of the network of the first agency that posses anchor information of the parent certification authority. This enables the device of the second agency to be authenticated by a network node of the first agency.

12 Claims, 3 Drawing Sheets

PORTABLE CERTIFICATION AUTHORITY

BACKGROUND

Secure communication and cooperation in computer networks, including ad hoc networks, is often based on the use of certificates. A certificate authority or certification authority (CA) is an entity (a trusted third party) that issues digital certificates for use by other parties. CA's are characteristic of many public key infrastructure (PKI) schemes. A public key certificate (or identity certificate) is a certificate which uses a digital signature to bind together a public key with an identity—information such as the name of a person or an organization, their address, and so forth. The certificate can be used to verify that a public key belongs to an individual.

A CA will issue a public key certificate which states that the CA attests that the public key contained in the certificate belongs to the person, organization, server, or other entity noted in the certificate. A CA's obligation in such schemes is to verify an applicant's credentials, so that users (relying parties) can trust the information in the CA's certificates. Commonly, if the user trusts the CA and can verify the CA's signature, then the user can also verify that a certain public key does indeed belong to whomever is identified in the certificate.

In an ad hoc network of mobile devices using a PKI, a CA is required. For example, emergency responders from different government and private agencies may wish to exchange information securely at the scene of an incident. This requires that a node from one agency can authenticate nodes of other agencies.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
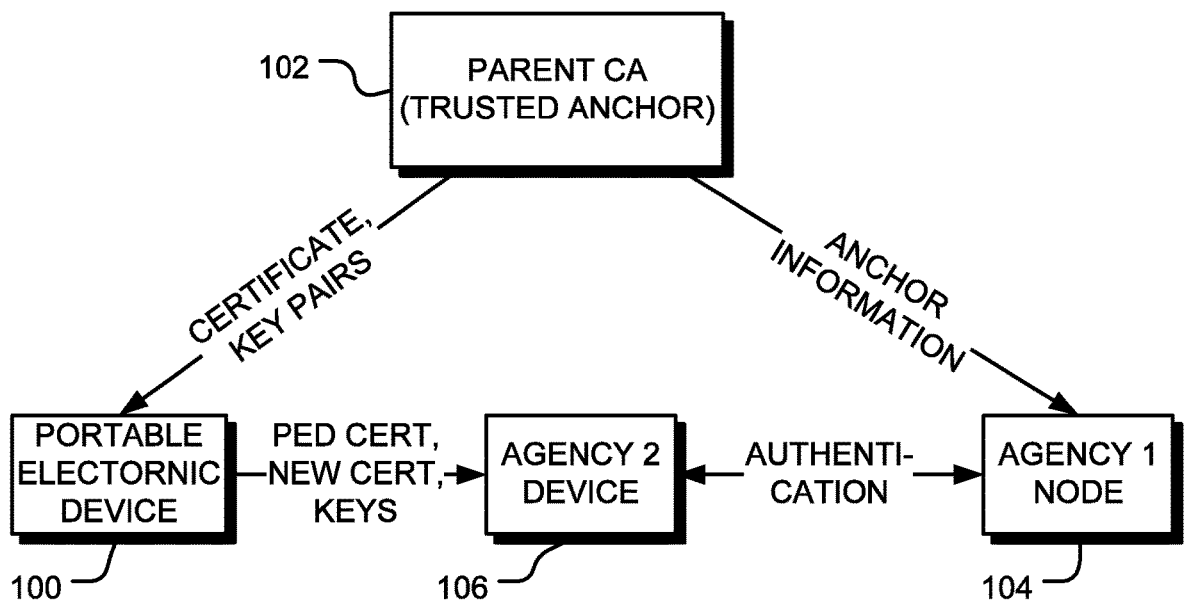
FIG. 1 is a block diagram depicting distribution of keys and associated certificates in a network, consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to the issuance of certificates in mobile, ad hoc networks. Certificates are issued by a portable electronic device that operates as a portable certification authority.

In one embodiment, a portable electronic device stores its own certificate that is signed by a root or parent Certification Authority (CA), in addition to certificates and corresponding keys to be issued. The device may be simple memory device, such a Universal Serial Bus (USB) memory stick, or it may have the capability to modify certificates by setting fields (such as 'name' or 'effective date') and then signing the certificate. It is not required to generate public-private key pairs since a number of key pairs may be pre-loaded into the portable electronic device by a parent CA. The parent CA should be a trusted central organization.

The portable electronic device may be assigned its own certificate by the parent CA, so that its identity may be verified. The certificate may have a near term expiration date that requires regular updating by the parent CA. This provides additional protection should the portable electronic device or its certificate be lost or fall into the wrong hands.

One application for the portable electronic device is for inter-agency communication for emergency responders. For example, emergency responders from different government and private agencies may wish to exchange information securely at the scene of an incident. This requires that a network node of one agency can authenticate nodes of other agencies. When it is time to operate with another agency, an agency officer at the scene can use the portable electronic device to load a certificate (signed by the portable electronic device CA), the corresponding private key, and the portable electronic device's own certificate (signed by the parent CA) into the device of another agency. Any node that has the parent CA as a trust anchor will now be able to authenticate with the device that received the new certificate and private key from the portable electronic device, since the node can use the trust anchor to check the certificate of the portable network device.

Usually it is the obligation of the CA to verify the credentials of the device or its user. However, in an embodiment of the present invention, this verification is performed by the user of the portable electronic device, rather than by the device. This reduces computation requirements and speeds the certification process. Further, a user can use their judgment and extend trust based on personal recognition, for example, in cases where no amount of computational effort or time will enable verification.

The trust anchor information includes the anchor key of the trusted issuer (a public signature key of the parent CA) and may also include the trusted issuer name, the trusted issuer unique identifier, the trusted public key algorithm, or the trusted public key parameters associated with the public key. This information is used to validate the certificate received from the portable CA device.

Pre-loading a limited number of key pairs to the portable electronic device limits the risk should the portable electronic device fall into the wrong hands. In addition, it allows certificates to be generated quicker than if key-pair generation was also required.

FIG. 1 is a diagram depicting distribution of certificates and associated keys in a network, consistent with certain embodiments of the invention. Referring to FIG. 1, a portable electronic device 100 receives a certificate and at least one key pair from a parent CA 102 (a trusted anchor in the network). It may also receive a private key of the parent CA to enable it to generate certificates on behalf of the parent CA. In addition, the parent CA sends anchor information (such as the public signature key of the parent CA) to a node 104 of a first agency network (Agency 1). A device 106 of a second agent (Agency 2) is initially not authenticated by the Agency 1 node 104 and cannot access the Agency 1 network through the node. The portable electronic device (PED) 100 is operable to generate a new certificate using the identity of the Agency 2 device and a pre-loaded key pair. The portable electronic device (PED) 100 is further operable to pass its own certificate (PED cert.) to the Agency 2 device 106, together with pre-loaded key pair and the corresponding new certificate. The Agency 2 device 106 may then use the new certificate and the key-pair to perform an authentication exchange (such as a challenge-response exchange) with the Agency 1 node 104. Since the Agency 1 node has the anchor information of the parent CA 102, is it able to authenticate that the Agency 2 device 106 is trusted and grant access to the Agency 2 network. In this manner, the network of any agency that processes the anchor information of the parent CA may be accessed by devices of other agencies when provided with information from an appropriate portable electronic device. This facilitates inter-agency communication.

Figure 2:
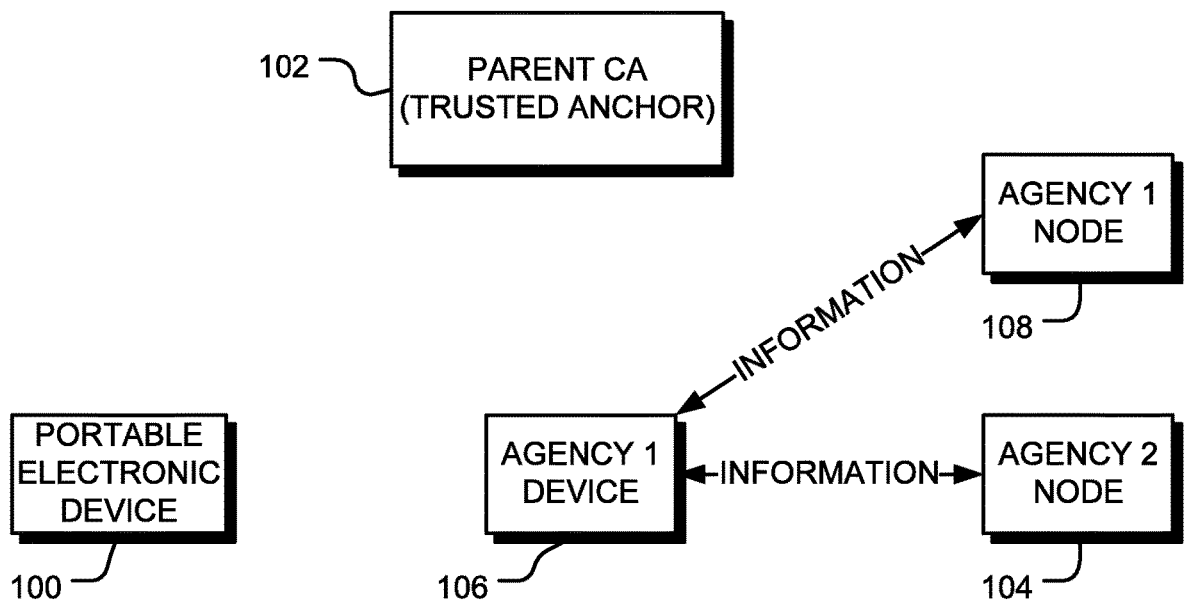
FIG. 2 is a block diagram depicting information flow in a network, consistent with certain embodiments of the invention.

FIG. 2 is a diagram depicting information flow in a network, consistent with certain embodiments of the invention. Referring to FIG. 2, once the Agency 1 device 106 is authenticated by the Agency 2 node 104, it may access information on the Agency 2 network. In addition, the Agency 1 device 106 may also access information on its own network via Agency 1 node 108.

Figure 3:
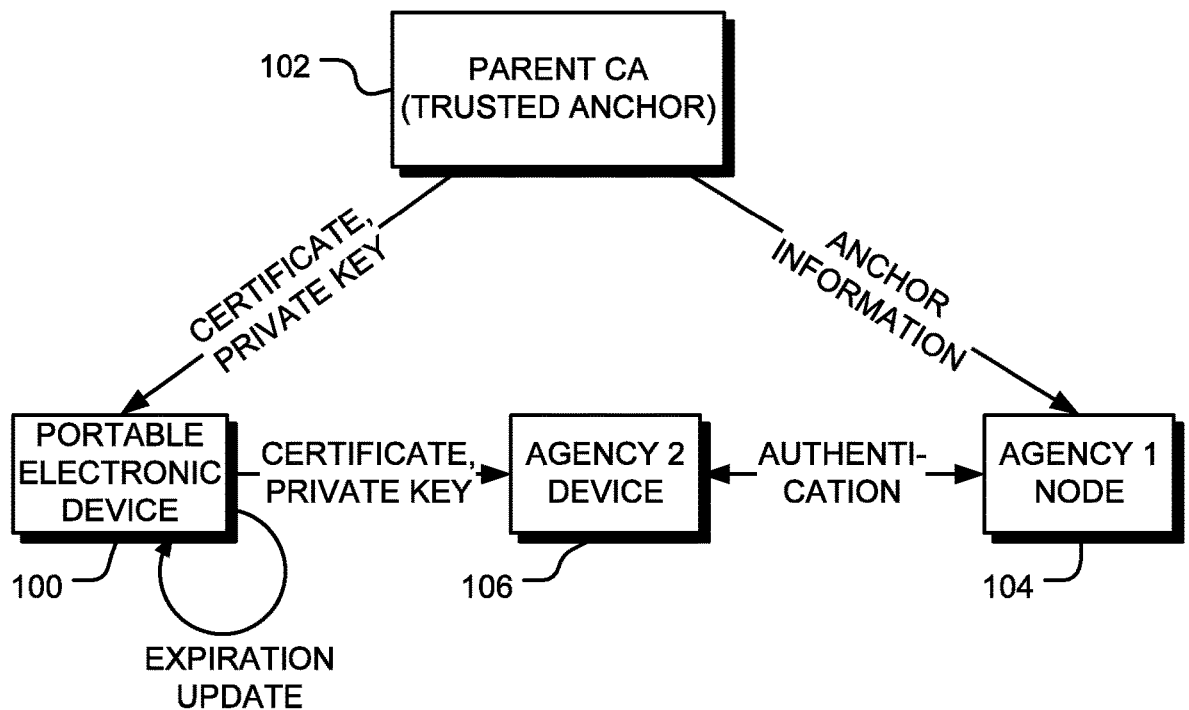
FIG. 3 is a block diagram depicting distribution of keys and associated certificates in a network, consistent with certain embodiments of the invention.

In a still further embodiment, shown in FIG. 3, a portable electronic device 100 is preloaded with a private key and a digital certificate (which contains the corresponding public key) from the parent CA 102. These may be passed to an Agency 2 device 106. The Agency 2 device is then able to participate in an authentication exchange with an Agency 1 node 104 and thereby gain access to the Agency 1 network. Optionally, the portable electronic device 100 may have sufficient intelligence to update the certificate with an expiration date. This allows for periodic renewal of trust in the portable electronic device.

The portable electronic device may be password protected and tamper resistant.

The portable electronic device may be used to form a trust bridge if it adds an additional certificate to an existing node under a CA different from that of the certificates already at that node.

The portable electronic device may be configured as a key fob.

It is noted that the portable electronic device is not required to authenticate the Agency device to which it is providing the certificate and key pair. This is because the authentication process may be performed by the person carrying the portable device, who may authenticate the user of the agency device by some other means, such as personal recognition or a show of identification. Thus, the computational and memory requirements of the portable electronic device are much reduced.

Figure 4:
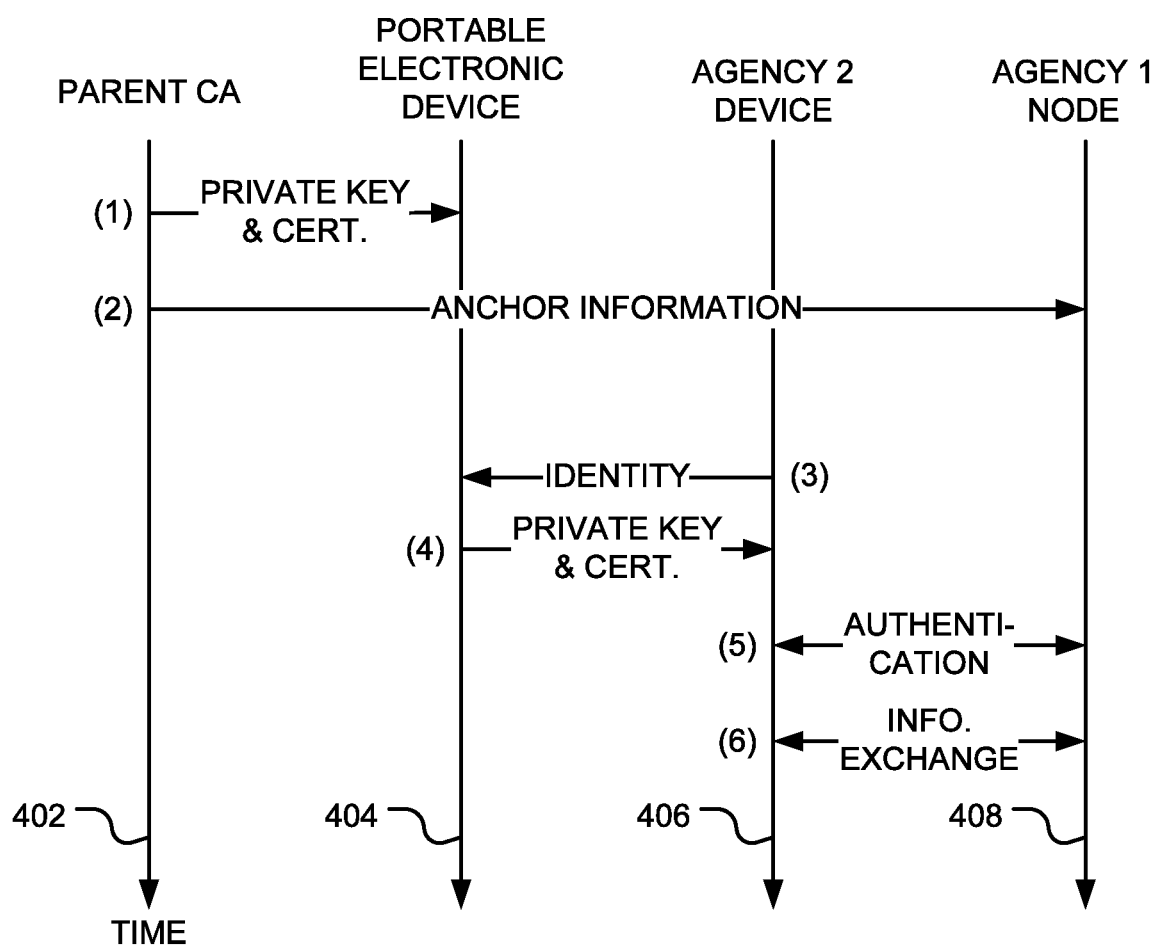
FIG. 4 is a sequence diagram of information flow consistent with certain embodiments of the invention.

FIG. 4 is a sequence diagram of information flow consistent with certain embodiments of the invention. FIG. 4 shows time lines 402, 404, 406 and 408 of a parent CA, a portable electronic device, an Agency 2 device and an Agency 1 node, respectively. Initially, at time (1) in FIG. 4, one or more key pairs and a certificate are transmitted from the parent CA to the portable electronic device. The certificate indicates that the portable electronic device is trusted by the parent CA. Also at (1), the parent CA sends a private key to the portable electronic device to enable to the portable electronic device to sign certificates on behalf of the parent CA. At time (2) the parent CA sends anchor information, such as it public signing key, to one or more nodes of a network of Agency 1. It will be apparent to those of ordinary skill in the art that the order of events (1) and (2) may be reversed, or that the requisite information may be loaded onto the portable electronic device and the Agency 1 node from other entities that are trusted by the parent CA. Optionally at time (3) an Agency 2 device identifies itself to the portable CA device. The portable CA device responds at time (4) with a private key, a new certificate (which includes the corresponding public key) based on the Agency 2 device's identity, and it own certificate. If the Agency 2 device does not provide its identity to the portable electronic device, the new certificate may contain a default or generic identity. In the latter case the new certificate may even be pre-loaded onto the portable CA device. However, it may be advantageous for the portable CA device to update the expiration date of the certificate periodically before it is issued to the target device.

At time (5) the Agency 2 device may use the information received from the portable CA device to participate in an authentication exchange with the Agency 1 node. For example, the Agency 1 node may issue a challenge to the Agency 2 device and check the response to the challenge. If the Agency 2 device is authenticated, it may begin to exchange information with the Agency 1 node at time (5). Thus, the Agency 2 mode has been able to gain access to specified Agency 1 information without having to contact some central authority.

The present invention, as described in embodiments herein, is implemented using a programmed processor in the portable electronic device that executes programming instructions that are broadly described above in sequence diagram form. The programming instructions can be stored on any suitable computer readable storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Such variations are contemplated and considered equivalent.

Figure 5:
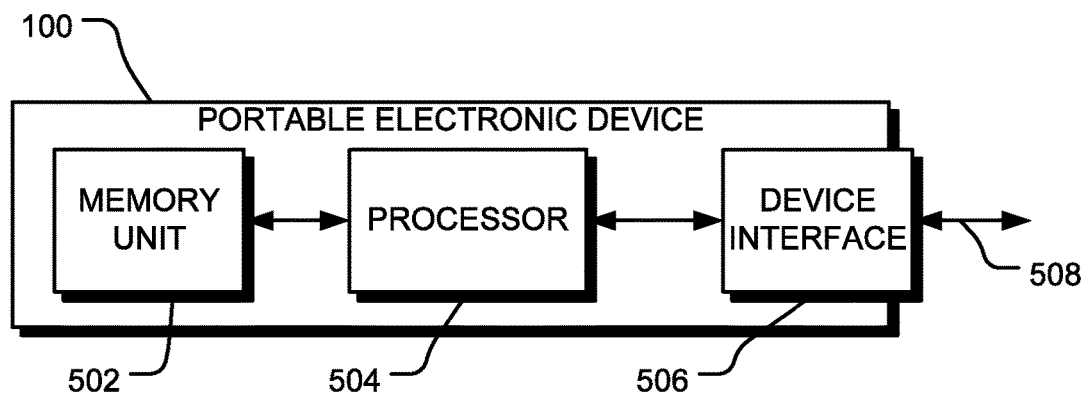
FIG. 5 is a block diagram of a portable electronic device consistent with certain embodiments of the invention.

FIG. 5 is a block diagram of a portable electronic device consistent with certain embodiments of the invention. The portable electronic device 100 includes a memory unit 502 for storing key pairs received from a parent CA and a processor 504, coupled to the memory, which may be used to generate certificates based upon the key pairs. The memory 502 may be a flash memory, for example. A device interface 506 coupled to the processor may be used to couple to the portable electronic device to a network device or to the parent CA and transmit an information signal 508. The interface may include a Universal Serial Bus (USB) that provides for information transfer and also provides power to the portable memory unit. In a further embodiment, the interface is a wireless interface such as a radio or optical interface. The elements 502, 504 and 506 may be at least partially contained with a robust housing.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for authenticating a second portable device belonging to a second agency to access a network of a first agency, the method comprising:
   receiving by a first portable electronic device, a pair of keys from a parent certificate authority belonging to the first agency;
   the first portable electronic device receiving from the parent CA a certificate that can be used to verify the identity of the first portable device;
   storing by the first portable device, the pair of keys and the certificate in the portable electronic device;
   the first portable device transmitting to the second portable device, the certificate received from the parent CA used to identify the first portable device;
   the first portable device transmitting a private key from the pair of keys received by the first portable device from the parent certificate authority and also transmitting a corresponding public key certificate to the second portable device of the second agency so that the network of the first agency can authenticate the second portable device of the second agency using the private key and anchor information;
   further comprising receiving identity information from the second portable electronic device of the second agency, wherein the public key certificate is further dependent upon the identity information.

2. A method in accordance with claim 1, wherein the public key certificate is generated by the parent certification authority and is stored in the first portable electronic device.

3. A method in accordance with claim 1, wherein the public key certificate is generated by the parent certification authority and is stored in the first portable electronic device, the method further comprising the first portable electronic device periodically updating an expiration date of public key certificate.

4. A method in accordance with claim 1, wherein the public key certificate is generated by the first portable electronic device using a private key of the parent Certification Authority.

5. A method in accordance with claim 1, further comprising storing a plurality of pairs of keys on the first portable electronic device.

6. A method in accordance with claim 2, wherein the public key certificate to be issued to the second device of the second agency has an expiration date, the method further comprising the parent certification authority updating the public key certificate.

7. A method to certify a second portable electronic device of a second agency by using a first portable electronic device of a first agency that posses anchor information of a parent certification authority, the method comprising:
   receiving by the first portable electronic device, a pair of keys issued from a parent certificate authority belonging to the first agency;
   the first portable device receiving from the parent CA a certificate that can be used to verify the identity of the first portable device;
   the first portable electronic device storing the pair of keys issued by the parent certification authority, in the first portable electronic device;
   the first portable electronic device generating a public key certificate dependent upon the pair of keys;
   the first portable electronic device transmitting a private key of the pair of keys and the public key certificate from the first portable electronic device to the second portable electronic device of a second agency to allow the second portable electronic device of the second agency to be authenticated by the network of the first agency using the anchor information;
   further comprising receiving identity information from the second portable electronic device of a second agency, wherein the public key certificate is further dependent upon the identity information.

8. A first portable electronic device for certificate issuance to a second portable network device, comprising:
   a memory unit operable to store a key pair, comprising a public key and a private key generated by a parent Certification Authority, and a private signature key of the parent Certification Authority;
   a computer readable medium containing a program of instructions for certificate generation;
   a processor, coupled to the memory unit and the computer readable medium, operable to execute the program of instructions to generate a certificate signed with the private signature key of the parent Certification Authority; and
   an interface coupled to the processor and operable to communicate the key pair and the certificate to the second portable network device so that the second portable network device can authenticate to the network using the private key pair;
   wherein the interface is further operable to receive identity information from the second portable network device, and wherein the certificate is dependent upon the identity information and the public key.

9. A first portable electronic device in accordance with claim 8, wherein the interface is a Universal Serial Bus interface.

10. A first portable electronic device in accordance with claim 8, wherein the interface is a wireless interface.

11. A first portable electronic device in accordance with claim 8, wherein the memory unit comprises flash memory.

12. A first portable electronic device in accordance with claim 8, wherein the memory unit comprises the computer readable medium.

* * * * *